July 7, 1925. Re. 16,110

F. N. SAVARD

DEVICE FOR SOFTENING SHOES

Original Filed Sept. 15, 1922

INVENTOR-
Francois N. Savard
By his Attorney
Nelson M. Linnard

Reissued July 7, 1925. Re. 16,110

UNITED STATES PATENT OFFICE.

FRANCOIS N. SAVARD, OF AVON, MASSACHUSETTS, ASSIGNOR TO UNITED SHOE MACHINERY CORPORATION, OF PATERSON, NEW JERSEY, A CORPORATION OF NEW JERSEY.

DEVICE FOR SOFTENING SHOES.

Original No. 1,501,139, dated July 15, 1924, Serial No. 588,437, filed September 15, 1922. Application for reissue filed February 24, 1925. Serial No. 11,385.

*To all whom it may concern:*

Be it known that I, FRANCOIS N. SAVARD, a citizen of the United States, residing at Avon, in the county of Norfolk and Commonwealth of Massachusetts, have invented a new and useful Improvement in Devices for Softening Shoes, of which the following is a specification.

This invention relates to a device for softening portions of shoes, particularly box toes and has for its object to provide a heater through the medium of which the toe portions of shoes, and particularly the box toe or stiffener for the toe cap, may be heated, and thereby softened preparatory to undergoing the lasting operation.

In the manufacture of shoes at the present time it is customary to utilize artificially prepared sheet materials as substitutes for leather to stiffen and reinforce certain portions of the shoe, particularly the toe cap and in order to properly last the shoe at the toe portion where it is necessary to wipe the various materials comprising the toe cap, toe box and lining over the bottom of the last it becomes necessary to soften said materials, particularly the toe box, to render them pliable in order that said toe box, together with the toe cap, will not break or crack while being subjected to the unavoidable strains incident to the lasting operation.

In former types of toe-softening apparatus the toe of the shoe is inserted horizontally into a heating chamber through an opening in the front vertical wall of such chamber, and the source of heat is located under the space occupied by the toe. Those types permit the escape of a large proportion of the available heat through the opening into which the toe is inserted, and the flow of heated air or vapor, as the case may be, causes the heat to impinge on certain parts of the shoe and not on others, with the result that the heating is not uniformly distributed. Furthermore, since much of the heat is permitted to escape as aforesaid, it is necessary to supply more heat than the work requires, for otherwise the softening process would be so slow as to retard production. Consequently, by supplying sufficient heat to overcome the great waste and maintain the desired rate of production it frequently happens that the shoes are burned at those points against which the current impinges or at which the heat is otherwise concentrated.

In view of the conditions above stated an object of the present invention is to provide a toe softening apparatus in which the available heat will be so much conserved that the desired softening effect may be obtained without maintaining a temperature that would burn the leather and without retarding production. A feature of the invention consists in an improved type and arrangement of heat-radiating means forming a heating chamber that is closed except at the bottom where an opening is provided to permit inserting the toes of the shoes upwardly. The heat radiated in said chamber, having no means of escape except at the bottom, and being constrained in the chamber by its natural tendency to rise, is therefore conserved in an inert state and affects all parts of the work uniformly. For this reason the degree of heat necessary to accomplish the desired softening effect may be low compared to that required in other types of apparatus, and since there is no appreciable current or flow in the chamber the heat is never precipitated against or concentrated at any area of the work, and one of the common causes of burning is avoided.

The invention consists in the combination and arrangement of parts set forth in the following specification and particularly pointed out in the claims thereof:

Referring to the drawings.

Like numerals refer to like parts throughout the several views of the drawings.

Figures 1, 2:
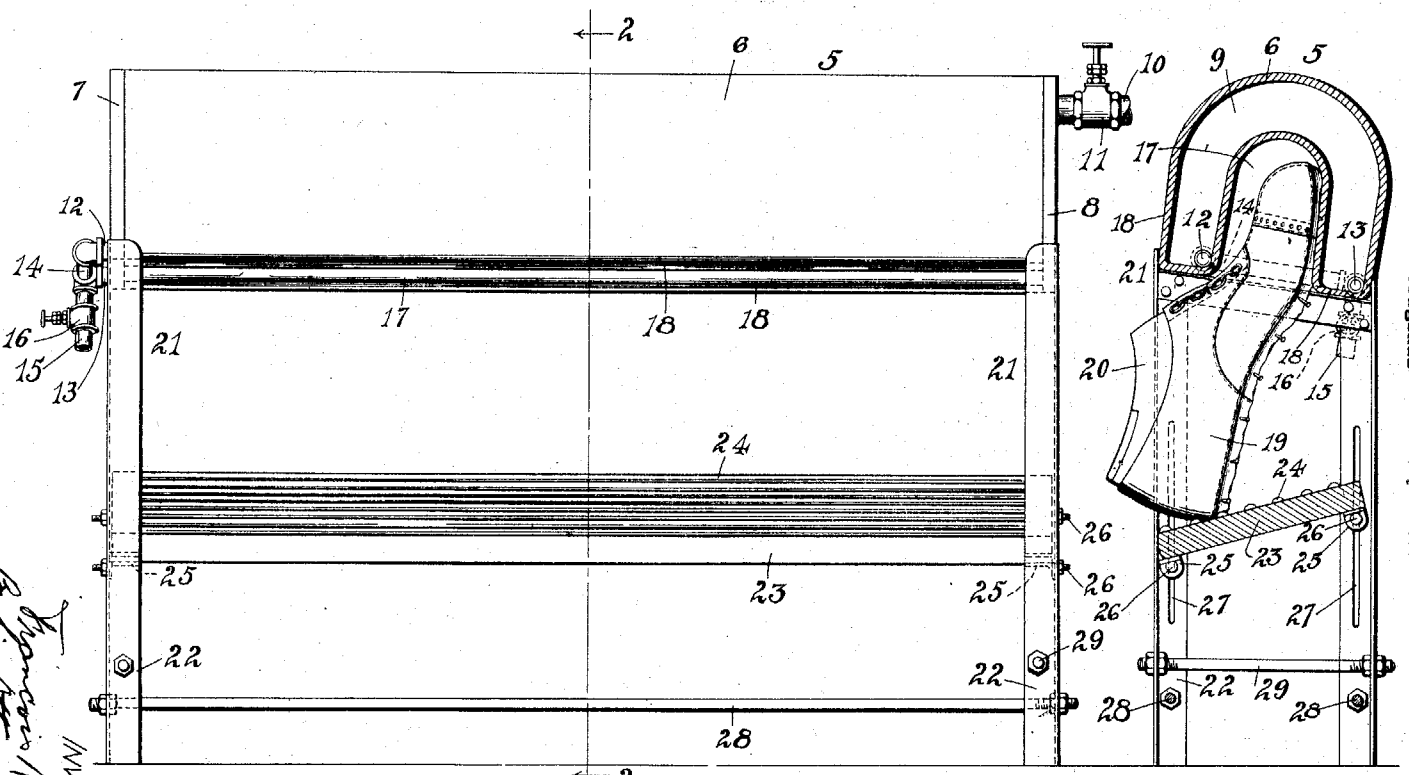
Figure 1 represents a front elevation of a device for softening shoes embodying the invention.
Fig. 2 is a transverse section taken on the line 2—2 of Fig. 1.

In the drawings, 5 represents a casing constituting a heating unit and embodying therein a central body member 6 at the opposite ends of which are plates 7 and 8. The casing 5 is constructed in the form of an inverted U and the interior thereof constitutes a chamber for the reception of a heating medium, preferably live steam, which is admitted through a pipe 10 at one end of said casing. The passage of steam through the pipe 10 into the chamber 9 is controlled by a valve 11. Discharge orifices 12 and 13 are provided at the end of the casing 5 opposite the entrance pipe 10, and discharge pipes 14 and 15 communicate therewith for the purpose of carrying off the steam or the condensation therefrom. A valve 16 is provided for the pipe 15.

The formation of the casing 5 is such as to provide a recess 17 in the under side thereof between two separate confronting portions 18 of said casing, and the plates 7 and 8 not only close the opposite ends of the chamber 9, but the opposite ends of the recess 17 as well. The recess 17 is of sufficient size and form to receive the toe portions of a plurality of shoes 19 as illustrated in Fig. 2, the latter being in the process of construction, each shoe being located upon a last 20. The casing 5 is mounted upon a suitable frame 21 embodying therein legs 22 and is tipped at a slight angle upon said frame to facilitate the insertion and removal of the shoes to and from the recess 17.

Means are provided for supporting the shoes 19 while being heated and for adjusting the height of the supporting means as follows: Mounted upon the frame 21 beneath the casing 5 is a shelf 23, the upper surface of which is provided with longitudinally extending strips 24 forming corrugations provided for the purpose of preventing the shoe from slipping upon said shelf and also for providing a means for positioning the heel portion of said shoe thereon. The shelf 23 is preferably inclined at a slight angle to a horizontal plane and rests upon angular supporting members 25 which are adjustable vertically upon the legs 22, and said members are held in position upon said legs by bolts 26 which pass through slots 27 provided in said legs. The inclination of the shelf 23, moreover, may be changed if desired, by adjusting the height of the forward and rear supporting members 25 relatively to each other. All sizes of shoes may, therefore, be supported upon the shelf 23 beneath the casing 5 and treated within the recess 17, and the distance to which said shoes may project within said recess is determined by the position of the heel portion of said shoe upon the shelf 23 and the height of said shelf upon the frame 21. Tie rods 28 and 29 are provided to reinforce the legs 22 on the frame 21.

The general operation of the device is as follows: In preparing the shoes for lasting after the upper of the shoe 19 has been pulled over the last 20 and it is ready to be operated upon by the lasting machine, the shoe is placed upon the shelf 23 with the toe portion thereof projecting into the recess 17 of the casing 5, there being sufficient space provided for a plurality of said shoes to be placed upon said shelf and rest thereon side by side. The shelf 23 is located in an inclined position, the inclination of which may be changed as desired by adjusting the angular supporting members 25, and the height of said shelf relatively to the casing 5 may also be adjusted in a similar manner. The strips or corrugations 24 provided upon the upper surface of the shelf 23 are utilized to position the heel portion of the shoes upon said shelf and also to prevent said shoes from slipping thereon, and the distance to which the toe portion of the shoes may project into the recess 17 is determined by the position of the heel portion of the shoe upon the shelf 23. Steam admitted to the chamber 9 heats the walls of the casing 5, and the radiated heat which is confined within the recess 17 because of the position and form of said recess acts upon the toe portion of the shoe and particularly upon the toe box thereof, and after the toe portion of the shoe has been within the recess a sufficient length of time for said toe box to be rendered pliable, said shoe is withdrawn and subjected to the lasting operation without danger of injuring the toe portion of the shoe.

Having thus described my invention, what I claim as new and desire to secure by Letters Patent of the United States is:

1. A device of the character described comprising, in combination, a U-shaped heating unit provided with a U-shaped chamber for a heating medium located within the interior thereof and a recess in the side thereof, and means to support a shoe with a portion thereof projecting into said recess.

2. A device of the character described comprising, in combination, a U-shaped heating unit provided with a U-shaped chamber for a heating medium located within the interior thereof and a recess in the side thereof, and means to support a shoe with a portion thereof projecting into said recess, said shoe support being adjustably mounted so as to vary the distance between the same and said heating unit.

3. A device of the character described comprising, in combination, a heating unit provided with a chamber for a heating medium located within the interior thereof and a recess in the side thereof, and a support for a shoe located adjacent to said heating unit, said shoe support being adjustably mounted so as to vary the distance between the same and said heating unit and also to incline said support at an angle to a horizontal plane.

4. A device of the character described comprising, in combination, a heating unit provided with a chamber for a heating medium located within the interior thereof and a recess in the side thereof, means to support a shoe with a portion thereof projecting into said recess, and means whereby the heel portion of said shoe may be positioned and prevented from slipping upon said supporting means.

5. A device of the character described comprising, in combination, a heating unit provided with a chamber for a heating medium located within the interior thereof and a recess in the side thereof, and an inclined shoe support arranged to support a shoe by its heel end with the toe end in said recess, said shoe support having provision for preventing the heel end from slipping.

6. A device of the character described comprising, in combination, a heating unit provided with a chamber for a heating medium located within the interior thereof and a recess in the side thereof, and a support for a shoe located adjacent to said heating unit, said support being provided with a corrugated upper surface to prevent a shoe from slipping thereon.

7. A device of the character described comprising, in combination, a U-shaped casing provided with a recess in a side thereof and having a U-shaped steam chamber located within the interior thereof, means to conduct steam to said chamber, said steam within said chamber being segregated from said recess, and means to support a shoe with a portion thereof projecting into said recess.

8. A device of the character described comprising, in combination, a casing provided with a recess in the under side thereof and having a steam chamber located within the interior thereof, means to conduct steam to said chamber, and a support for a shoe located beneath said casing.

9. A device of the character described comprising, in combination, a casing provided with a recess in the under side thereof and having a steam chamber located within the interior thereof, means to conduct steam to said chamber, said steam within said chamber being segregated from said recess, and a support for a shoe located beneath said casing and adjustably mounted so as to vary the distance between said support and said casing and also to incline said support at an angle to a horizontal plane, said support being provided with a corrugated upper surface to prevent a shoe from slipping thereon.

10. A device of the character described comprising a steam-chest of U-shaped cross-section arranged with the recess opening at the bottom, and means to support a shoe so that the toe will project upwardly and into said recess.

11. A device of the character described comprising a heat-radiating element forming a recess open at the bottom and closed at the top, and means to support a shoe toe-end-up with the toe-end projecting into said recess.

12. A device of the character described comprising an elongated heat-radiating member forming a trough to receive and closely envelop the toe-ends of a plurality of shoes arranged side by side, and means to support a series of shoes so that their toe ends will project into said trough.

13. A device of the character described comprising a heat-radiating element forming an inverted trough-shaped recess, and means to support one or more shoes by their heel-ends with their toe-ends projecting upwardly and into said recess.

14. A device of the character described comprising a steam-chest forming a recess in its under side to receive the toe of a shoe, and means under said steam-chest to support a shoe toe-end-up so that the toe will project into said recess, said steam-chest and said supporting means being relatively adjustable to vary the extent to which the shoe may project into said recess.

15. A device of the character described comprising two separate confronting heat-radiating elements forming a space or recess open at the bottom to receive the toe-end of a shoe, and means under said space or recess to support a shoe toe-end-up with the toe-end projecting into said space or recess.

In testimony whereof I have signed my name to this specification.

FRANCOIS N. SAVARD.